United States Patent
Blagodurov

(10) Patent No.: US 10,171,382 B2
(45) Date of Patent: Jan. 1, 2019

(54) MECHANISM OF IDENTIFYING AVAILABLE MEMORY RESOURCES IN A NETWORK OF MULTI-LEVEL MEMORY MODULES

(71) Applicant: Advanced Micro Devices, Inc., Sunnyvale, CA (US)

(72) Inventor: Sergey Blagodurov, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 217 days.

(21) Appl. No.: 14/748,209

(22) Filed: Jun. 23, 2015

(65) Prior Publication Data

US 2016/0380921 A1 Dec. 29, 2016

(51) Int. Cl.
*G06F 15/173* (2006.01)
*H04L 12/911* (2013.01)
*G06F 3/06* (2006.01)
*H04L 12/721* (2013.01)

(52) U.S. Cl.
CPC .......... *H04L 47/822* (2013.01); *G06F 3/0604* (2013.01); *G06F 3/067* (2013.01); *G06F 3/0644* (2013.01); *H04L 47/781* (2013.01); *H04L 45/12* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 6,925,628 B2 * | 8/2005 | Ogawa | ............... | G06F 17/5045 716/104 |
| 7,313,795 B2 * | 12/2007 | Chew | ................... | G06F 9/5061 709/226 |
| 7,546,354 B1 * | 6/2009 | Fan | ..................... | G06F 11/2025 709/219 |
| 8,054,763 B2 * | 11/2011 | Mehrotra | ............ | H04L 67/1097 370/254 |
| 8,571,473 B2 * | 10/2013 | Lee | ....................... | H04W 84/18 370/338 |
| 8,787,154 B1 * | 7/2014 | Medved | ................. | H04L 45/64 370/225 |
| 8,824,274 B1 * | 9/2014 | Medved | ................. | H04L 41/12 370/217 |
| 8,885,463 B1 * | 11/2014 | Medved | ................. | H04L 45/50 370/228 |

(Continued)

OTHER PUBLICATIONS

Dale, N., C++ Plus Data Structures, 1999, Jones and Bartlett Publishers, Inc., pp. 555-566.*

(Continued)

*Primary Examiner* — Alicia Baturay
(74) *Attorney, Agent, or Firm* — Liang & Cheng, PC

(57) ABSTRACT

A method of managing memory in a network of nodes includes identifying memory resources for each of the plurality of nodes connected to the network, storing memory resource information describing the memory resources, and based on the stored memory resource information, allocating a portion of the memory resources for execution of instructions in a workload, where at least a first node of the plurality of nodes is configured to execute the workload using the allocated portion of the memory resources.

20 Claims, 7 Drawing Sheets

(56) References Cited

U.S. PATENT DOCUMENTS

| | | | | |
|---|---|---|---|---|
| 9,237,463 | B2* | 1/2016 | Polehn | H04W 24/02 |
| 9,450,817 | B1* | 9/2016 | Bahadur | H04L 45/64 |
| 9,547,598 | B1* | 1/2017 | Karnowski | G06F 3/0688 |
| 9,647,960 | B2* | 5/2017 | Toillon | H04L 49/25 |
| 9,660,920 | B2* | 5/2017 | Toillon | H04L 12/437 |
| 9,705,781 | B1* | 7/2017 | Medved | H04L 45/64 |
| 2002/0044549 | A1* | 4/2002 | Johansson | H04L 45/02 370/386 |
| 2003/0046426 | A1* | 3/2003 | Nguyen | H04L 41/0681 709/242 |
| 2015/0244801 | A1* | 8/2015 | Guo | H04L 67/2852 709/204 |

OTHER PUBLICATIONS

"Blackcomb: Hardware-Software Co-design for Non-Volatile Memory in Exascale Systems." Blackcomb. DOE Office of Science's Advanced Scientific Computing Office, n.d. Web. Jun. 23, 2015. <https://ft.ornl.gov/trac/blackcomb>.

"Memristor." Wikipedia. Wikimedia Foundation, n.d. Web. Jun. 23, 2015. <http://en.wikipedia.org/wiki/Memristor#Potential_applications>.

"NVM Programming Technical Work Group." NVM Programming Technical Work Group. Solid State Storage Initiative, n.d. Web. Jun. 23, 2015. <http://snia.org/forums/sssi/nvmp>.

Anthony, Sebastian. "IBM to Build Exascale Supercomputer for the World's Largest, Million-antennae Telescope | ExtremeTech." ExtremeTech. N.p., Apr. 2, 2012. Web. Jun. 23, 2015. <http://www.extremetech.com/extreme/124561-ibm-to-build-exascale-supercomputer-for-the-worlds-largest-million-antennae-telescope>.

Clark, Jack. "Intel: Non-volatile Memory Shift Means Chips Need an Overhaul | ZDNet." ZDNet. N.p., Sep. 13, 2012. Web. Jun. 23, 2015. <http://www.zdnet.com/intel-non-volatile-memory-shift-means-chips-need-an-overhaul-7000004221/.

Harker, John. "Tiered Storage Design Guide." Hitachi Data Systems Corporation, Santa Clara, CA, Sep. 2010.

Lim, Kevin, et al. "System-level implications of disaggregated memory." High Performance Computer Architecture (HPCA), 2012 IEEE 18th International Symposium on. IEEE, 2012.

Shankland, Stephen. "IBM Leaps Two Hurdles for Next-gen Memory—CNET." CNET News. CBS Interactive, Jun. 29, 2011. Web. Jun. 23, 2015. <http://news.cnet.com/8301-30685_3-20075608-264/ibm-leaps-two-hurdles-for-next-gen-memory/>.

* cited by examiner

| memory resource table 400 | | | | |
|---|---|---|---|---|
| memory level ID 401 | memory location 402 | memory type 403 | memory size 404 | other parameters 405 |
| | | | | |
| | | | | |
| | | | | |

FIGURE 4A

| link table 410 | | | |
|---|---|---|---|
| memory resource IDs 411 | channel type 412 | coherence 413 | other parameters 414 |
| | | | |
| | | | |
| | | | |

FIGURE 4B

MECHANISM OF IDENTIFYING AVAILABLE MEMORY RESOURCES IN A NETWORK OF MULTI-LEVEL MEMORY MODULES

TECHNICAL FIELD

This disclosure relates to the field of memory management and, in particular, to management of memory resources in a network of computing nodes.

BACKGROUND

In a modern datacenter, multiple computing nodes are be connected together in a network to allow the nodes to share resources and information. The computing nodes can be connected in a network according to various topologies, including ring, star, tree, mesh, or a combination of these and/or other topologies. The implementation of the communication channels between the networked computing nodes can also be varied; for example, different nodes in the same network can be connected to the network using different data transmission technologies, such as Ethernet, optical fiber, or wireless technologies.

Recently, datacenters have been configured to allow individual computing nodes to utilize memory resources of other nodes. One type of node is a memory blade, which can be used to augment another node's memory capacity with remote memory that can be dynamically apportioned in response to changing memory capacity demand. Such remote memory is typically characterized by higher access latency. In addition, a conventional datacenter may lack the ability to apportion memory resources efficiently, given the wide range of possible topologies in which nodes can be arranged, while accounting for the differences in speed and capacity of the memory resources being apportioned. Such conventional datacenter may also accommodate only a single level of memory within each node.

BRIEF DESCRIPTION OF THE DRAWINGS

The present disclosure is illustrated by way of example, and not by way of limitation, in the figures of the accompanying drawings.

FIG. 4A illustrates a memory resource table, according to an embodiment.

FIG. 4B illustrates a link table, according to an embodiment.

DETAILED DESCRIPTION

Figure 1:
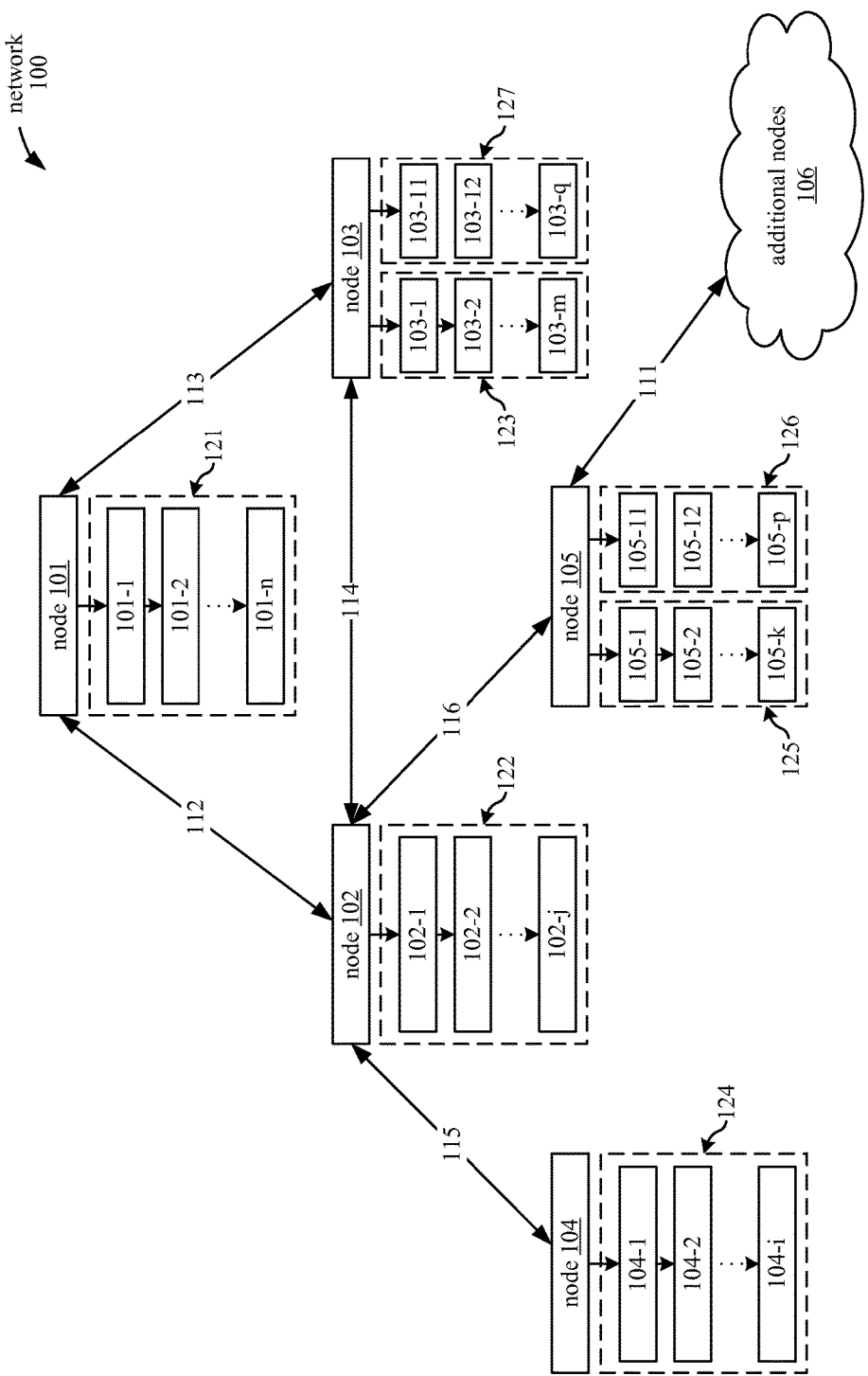
FIG. 1 illustrates an embodiment of a datacenter network.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

In one embodiment of a datacenter that includes multiple nodes, the individual nodes in the datacenter include multiple levels of memory, where memory resources are classified into the different memory levels depending on the speed, latency, power consumption, or other operational characteristics of the memory resources. Some of the nodes (i.e., computing nodes) in the datacenter are capable of providing computational resources, while other nodes (i.e., memory nodes) provide memory resources (without providing computational resources) that can be directly utilized by other nodes in the datacenter.

The datacenter also accommodates the multiple levels of memory in each node. The memory in the computing nodes are contained in multi-level memory modules (MLMs), such that the memory available to a single node for performing computations can be augmented by the MLMs of other nodes in the network to accommodate workload demands. Each node may include multiple MLMs; accordingly, the MLMs in a datacenter can be interconnected by both intra-node and inter-node networks. The MLMs may be connected according to various topologies at the intra-node or inter-node levels; for example, in different parts of the datacenter, the MLMs may be connected according to a ring, tree, mesh, star, or other arbitrary topology or combination of topologies.

Some of the nodes in the datacenter include relatively fast and smaller memory, such as die-stacked dynamic random access memory (DRAM), and slower and larger memory that is available as DRAM or non-volatile random access memory (NVRAM) modules. Additionally, the MLMs in the datacenter may include any arbitrary combination of memory capacity ratios between the different memory levels and/or memory technologies used at each of the different memory levels. Different MLMs can also have different numbers of memory levels.

In one embodiment, a runtime system operating within the datacenter is capable of discovering available memory resources in the MLMs of its connected nodes. The memory resources of the MLMs are then dynamically divided into multiple regions and/or sub-regions, each managed according to a different memory management scheme. The runtime system additionally provides a mechanism for storing information describing the discovered memory resources. The memory resource information is stored in a manner that facilitates the discovery process and the allocation of the memory resources to other nodes.

The memory resources within the various MLMs and within different levels in the MLMs can be located at different distances from the computing devices (e.g., CPUs, GPUs, ASICs, FPGAs, etc.) that are executing instructions in a workload. The differences in distance from the executing devices can affect the performance and power characteristics of the memory when the memory is allocated for executing the workload instructions. Thus, the datacenter runtime additionally implements a mechanism for constructing a memory hierarchy for a particular workload that accounts for the performance characteristics as affected by the distance of the memory resource from the executing device.

The availability of memory resources can change during normal operation of the datacenter; for example, the nodes in the datacenter may be connected or disconnected from the network, or may be powered up or powered down while the datacenter is running. Accordingly, the datacenter runtime includes a mechanism for adjusting a memory hierarchy for a workload based on the memory demands of the workload and the availability of the memory resources in the system.

FIG. 1 illustrates a datacenter network 100, according to an embodiment. Network 100 includes nodes 101-105 and additional nodes 106, which are connected by network links 111-116. The nodes 101-105 are illustrated individually, and each can represent a computing node, memory node, or other device having resources that are accessible to one or more other nodes connected to the network. The network links 111-116 represent communication channels and can each be implemented by any of various data transmission technologies, such as Ethernet, optical fiber, and the like. As illustrated in FIG. 1, nodes 101, 102 and 103 are connected in a ring configuration via network links 112, 113, and 114. Nodes 104 and 105 are connected to node 102 via network links 115 and 116, respectively. While the nodes 101-106 in the network portion 100 are illustrated in a particular configuration, alternative embodiments may have nodes that are arranged and connected differently.

The datacenter hosting the network 100 as illustrated in FIG. 1 includes nodes 106 in addition to the illustrated nodes 101-105; the individual nodes 106 are not illustrated in detail for the sake of clarity. In the network 100, each of the nodes 101-106 is connected via a network link to at least one other node in the network. Thus, each node is able to communicate with any other node in the network, either directly or indirectly through one or more other nodes. The datacenter network is highly scalable and can be expanded to include thousands or millions of nodes that are connected in a topology that can be highly non-uniform. Additionally, the datacenter network is capable of accommodating frequent addition and removal of nodes, resulting from changes in workload demand, power outages, component faults, or other factors.

The data transmission technology used to implement the network links 111-115 can differ for different parts of the network. For example, a datacenter operator may deploy optic fabric in some portions of the datacenter while other portions are connected via Ethernet. In one embodiment, the network is deployed as a common fat tree hierarchy which divides the nodes into subsets of racks, where the network performance within each rack is usually higher than between different racks.

Each of the nodes 101-105 in the network 100 controls memory resources in a multi-level memory (MLM) module. In particular, node 101 controls memory resources in MLM 121, which includes n memory levels 101-1, 101-2, to 101-$n$, where n represents the total number of memory levels in MLM 121. Node 102 controls memory resources in MLM 122, which includes j memory levels 102-1, 102-2, to 102-$j$, where j represents the total number of memory levels in MLM 122. Node 103 controls memory resources in MLM 123, which includes m memory levels 103-1, 103-2, to 103-$m$, and MLM 127, which includes q memory levels 103-11, 103-12, to 103-$q$, where m and q represent the total number of memory levels in MLMs 123 and 127, respectively. Node 104 controls memory resources in MLM 124, which includes i memory levels 104-1, 104-2, to 104-$i$, where i represents the total number of memory levels in MLM 124. Node 105 controls memory resources in MLM 125, which includes k memory levels 105-1, 105-2, to 105-$k$, and MLM 126, which includes p memory levels 105-11, 105-12, to 105-$p$, where k and p represent the total number of memory levels in MLMs 125 and 126, respectively. Nodes in the network 100 may have one or multiple MLMs; for example, nodes 101, 102, and 104 are illustrated as each having one MLM while nodes 103 and 105 each have two MLMs. In alternative embodiments, nodes may have three or more MLMs. While the MLMs and memory levels controlled by each node are illustrated in FIG. 1 as being connected in a particular fashion, the MLMS and memory levels can be connected according to other topologies (e.g., star, ring, mesh, etc.) in alternative embodiments.

Figure 2:
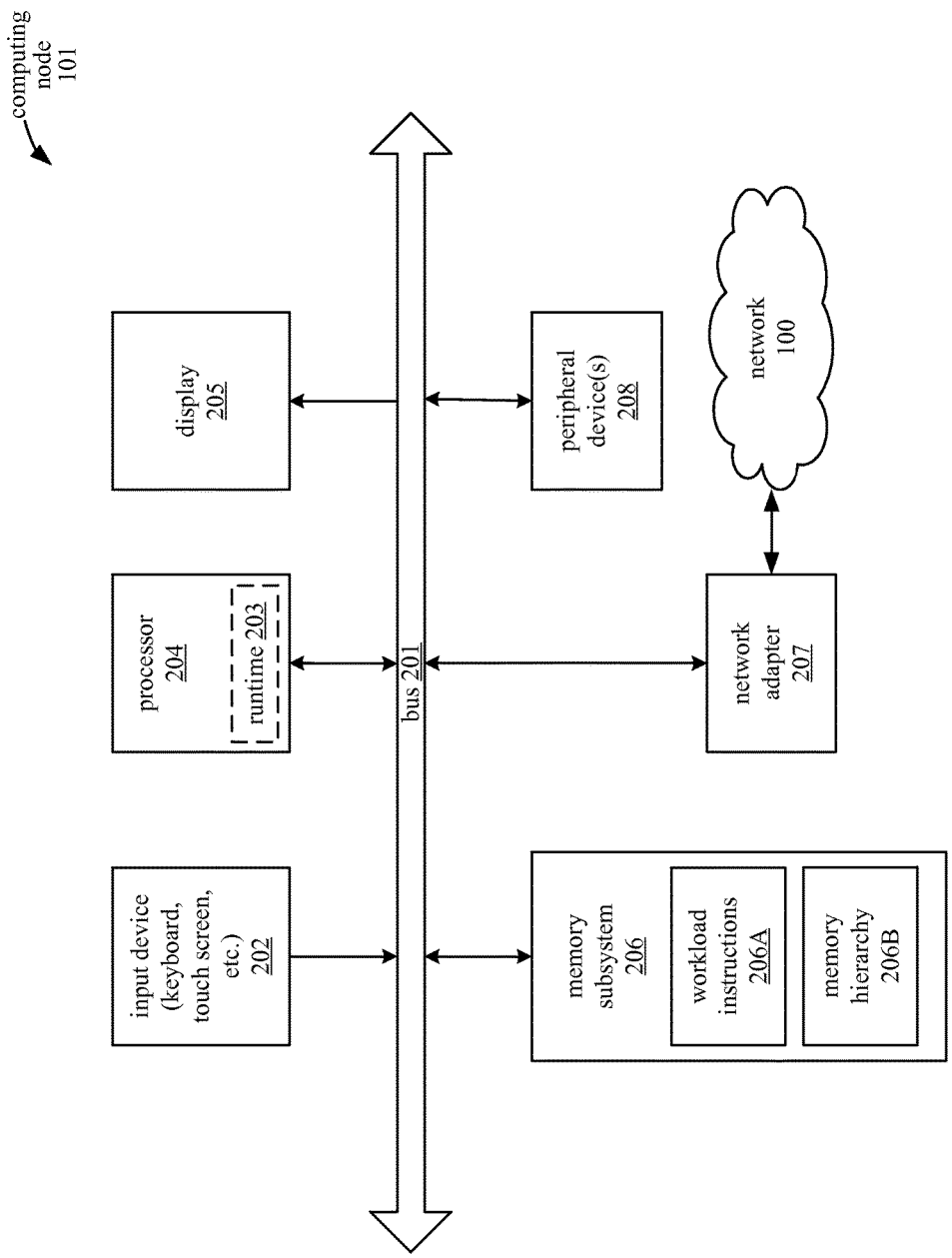
FIG. 2 illustrates an embodiment of a computing node in a datacenter network.

FIG. 2 illustrates an embodiment of a computing node 101 connected to the network 100. In general, the computing node 101 may be embodied as any of a number of different types of devices, including but not limited to a laptop or desktop computer, mobile phone, server, etc. The computing node 101 includes a number of components 202-208 that can communicate with each other through a bus 201. In computing system 100, each of the components 202-208 is capable of communicating with any of the other components 202-208 either directly through the bus 201, or via one or more of the other components 202-208. The components 201-208 in computing node 101 are contained within a single physical casing, such as a laptop or desktop chassis, server rack, or a mobile phone casing. In alternative embodiments, some of the components of computing node 101 may be embodied as peripheral devices such that the entire computing node 101 does not reside within a single physical casing.

The computing node 101 can optionally include user interface devices for receiving information from or providing information to a user. Specifically, the computing node 101 may include an input device 202, such as a keyboard, mouse, touch-screen, or other device for receiving information from the user. The computing node 101 may display information to the user via a display 205, such as a monitor, light-emitting diode (LED) display, liquid crystal display, or other output device.

Computing node 101 additionally includes a network adapter 207 for transmitting and receiving data via wires or wirelessly over the network 100. Computing node 101 also includes one or more peripheral devices 208. The peripheral devices 208 may include mass storage devices, location detection devices, sensors, input devices, or other types of devices that can be used by the computing node 101.

Computing node 101 includes a processor 204 that is configured to execute a workload defined by workload instructions 206A stored in the memory subsystem 206. Memory subsystem 206 can include memory resources included in one or more MLMs of the computing node 101, in addition to any other memory devices used by the node 101, such as random-access memory (RAM) modules, read-only memory (ROM) modules, hard disks, and other non-transitory computer-readable media. The memory subsystem 206 also stores a memory hierarchy 206B corresponding to the workload that contains memory resource information. The memory resource information stored in the memory hierarchy 206B describes memory resources controlled by other nodes in the network 100 that are available for use by the processor 204 for executing the workload defined by instructions 206A. The memory subsystem 206 is illustrated in FIG. 2 as part of the computing node 101; however, in alternative embodiments, some or all of the contents of the memory subsystem 206 can be stored in one or more other locations (e.g., in other nodes in the network 100).

The computing node 101 implements a runtime system 203 that executes the workload according to instructions 206A. While the runtime system 203 is illustrated in FIG. 2 as residing primarily in the processor 204, implementation of the runtime system 203 may also involve other components such as the memory subsystem 206. In alternative embodiments, a runtime system may be executed using resources from multiple nodes, rather than within a single node 101. In addition to executing a workload, the runtime system 203 also allocates memory resources for execution of the workload by identifying memory resources controlled by one or more nodes connected to the network 100, then adding memory resource information describing the memory resources to the memory hierarchy 206B. The memory resource information identifies the memory resource and may include additional information such as, for example, the location of the memory (i.e., an address of the node controlling the memory), the size of the memory resource, and/or performance characteristics of the memory.

The networked nodes transmit the memory resource information to the computing node 101 via network adapter 207. Each of the nodes in the network 100, including computing node 101 and the other nodes 102-106, is capable of determining when it is connected to the network 100, and responds to its connection to the network 100 by providing its memory resource information to the runtime system 203. Additionally, each of the nodes 101-106 is capable of detecting any changes to the memory resources it controls, and can respond by providing updated memory resource information reflecting the changes to the runtime system 203.

The runtime system 203 receives the memory resource information and, based on the received memory resource information, traverses the network 100 to discover the network links connecting the nodes that control the identified memory resources. The runtime system 203 thus determines the topology of the network in which the reported memory resources can be found, and can determine the distance between the computing node 101 and the node controlling a particular memory resource (e.g., the number of hops between the nodes).

The runtime system 203 is also capable of using the stored memory resource information to allocate a portion of the identified memory resources for the execution of a workload defined by workload instructions 206A. The runtime system 203 identifies the portion of memory resources to allocate to the workload based on a search of the stored memory resource information. For example, when the memory resource information is stored in a data structure that represents the nodes and links of the network topology, the runtime system 203 identifies memory resource to allocate by traversing the nodes in the data structure according to a depth-first or breadth-first search order. The runtime system 203 can select the memory resources for allocation based on various criteria, such as latency, memory capacity, some other performance characteristic of the memory, distance from the computing node executing the workload, etc. Having identified a portion of the memory resources to allocate, the runtime system 203 allocates the portion of memory resources by adding the portion of memory resources to the memory hierarchy 206B for the workload. For example, the runtime system 203 may copy memory resource information identifying the portion of memory resources into the memory hierarchy 206B.

With reference to FIG. 1, other nodes in the network, such as nodes 102-106, may have structures similar to node 101 as illustrated in FIG. 2. For example, each of the nodes 102-106 each include one or more network interfaces to allow communication with other nodes via the network links 111-116. Some of the nodes 102-106 may be nodes (e.g., memory blades) that provide memory resources to the other nodes in the network, but lack significant computational capabilities. Such nodes may lack a processor, such as processor 204, or human interface devices, such as input devices 202 and display 205.

Figure 3:
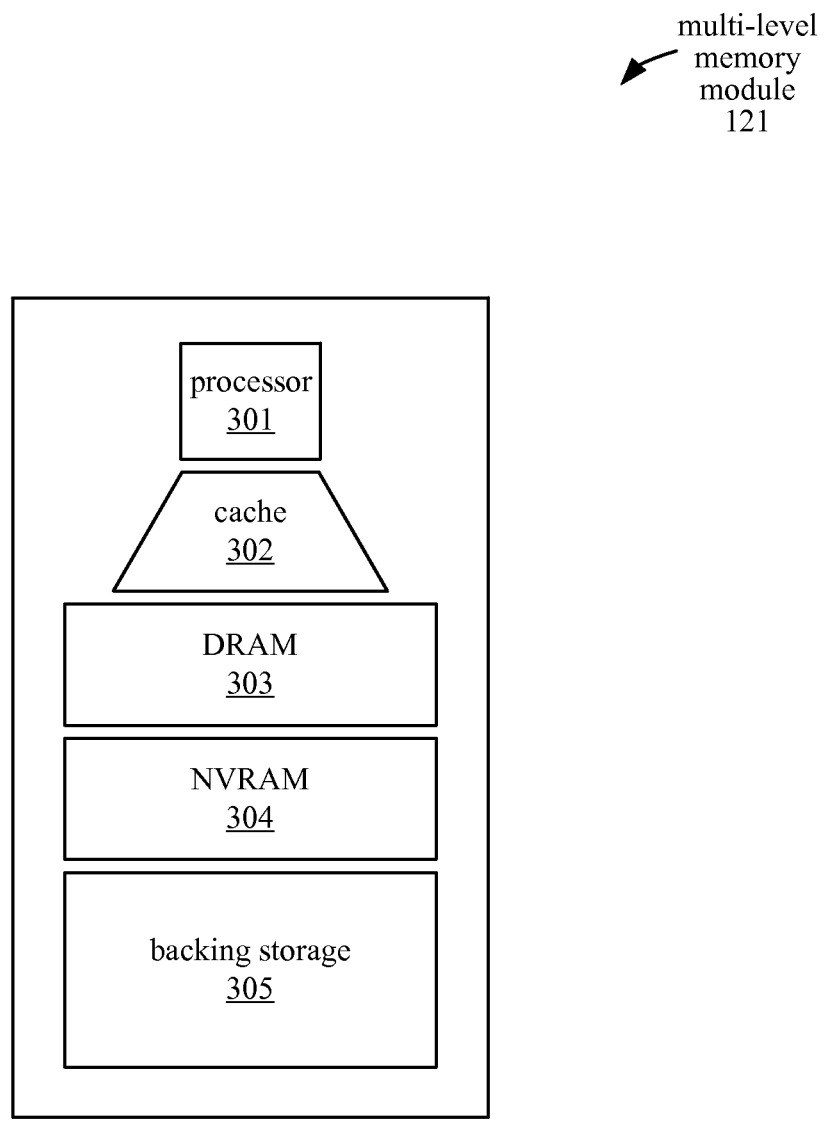
FIG. 3 illustrates an embodiment of a multi-level memory module.

FIG. 3 is a block diagram illustrating different types of memory present in the multilevel memory module (MLM) 121 of computing node 101, according to an embodiment. The MLM 121 is defined by a data structure storing information describing the memory resources controlled by computing node 101. The data structure defining the MLM 121 describes the memory resources provided by node 101 (e.g., the memory contained in memory subsystem 206) organized as memory levels 101-1 to 101-n.

As illustrated in FIG. 3, the MLM 121 includes the processor 301, processor cache 302, dynamic random access memory (DRAM) 303, non-volatile random access memory (NVRAM) 304 and backing storage 305 (e.g., flash memory, solid state disk, hard disk drive, etc.) that are controlled by its host node 101. As described herein, memory resources that are described as being included in the MLM 121 have information describing the memory resources stored in the data structure defining the MLM 121.

The MLM 121 includes memory resources having different capacities and performance characteristics; for example, the MLM 121 includes a faster and more expensive stacked DRAM memory 303 that is limited in capacity in addition to a NVRAM memory 304 (e.g. phase-change memory, spin-transfer torque memory, memristors, etc.) to be used as a slower, cheaper, and larger fallback memory. Each of the different types of memory or combination of memory types in the MLM 121 corresponds to one of the memory levels, such as memory level 101-1 or 101-2. Faster, smaller, and more expensive memory resources are located in the lower levels (e.g., level 101-1), while slower, larger, and cheaper memory resources are located in the higher levels (e.g., 101-n). For example, memory level 101-1 includes a faster and smaller memory type than memory level 101-2.

FIG. 4A illustrates a memory resource table 400 that stores memory resource information, according to an embodiment. The memory resource table 400 stores memory resource information received from the nodes 101-106; for example, node 102, in response to detecting a connection to the network 100, transmits memory resource information to node 101 and the runtime system 203 of node 101 stores the received memory resource information in the memory resource table 400. Similarly, each of the other nodes in the network 100 transmits memory resource information describing their respective memory resources to the runtime system 203 of node 101 to be stored in table 400.

The memory resource information stored in table 400 includes a memory level identifier (ID) 401, a memory location 402, a memory type 403, a memory size 404, and may include other parameters 405 such as wear-leveling, error correction code (ECC) type, energy consumption information, etc. The memory level ID 401 uniquely identifies a specific memory level of an MLM in the network 100; in other words, each memory level in the network 100 has a different memory level ID 401. The memory location 402 identifies the location of the memory resource that resides on the memory level having ID 401. The memory location 402 includes a hostname for the node controlling the memory level (e.g., an Internet Protocol (IP) address), a device name, and an access path of the memory. The memory type 403 indicates the memory technology of the identified memory resource (e.g., DRAM, phase change memory, flash memory, etc. or a combination of memory types) and the memory size indicates the capacity of the memory resource in bytes.

FIG. 4B illustrates a link table 410 that stores information about the network links connecting the memory resources, according to an embodiment. After receiving the memory resource information in table 400, the runtime system 203 reads the memory resource information and detects the network links connecting the memory resources described in the table 400. In order to determine whether a network link exists between two memory resources in the table 400, the runtime system 203 invokes a crawler that attempts to access the location of one of the memory resources from the location of the other memory resource. If the connection succeeds, the runtime system 203 creates a record describing the link in the link table 410. The network 100 accommodates multiple crawlers acting in parallel to discover links in this manner. Multiple crawlers may be invoked by a runtime system 203 on a single node or on multiple nodes, or may be invoked by multiple runtime systems running on multiple nodes.

Each link record in the link table 410 includes a field for the memory resource IDs 411, a channel type 412 of the link, coherence 413 of the link (e.g., full, relaxed, or none), and may include other parameters 414 such as the interconnect technology (HyperTransport, Ethernet, etc.). The memory resource IDs field 411 stores the unique identifier (corresponding to the whole string in table 400 or to a separate numerical resource ID value) for each of two or more memory resources that are connected by the link. The channel type 412 includes information about the link such as latency, bandwidth, energy characteristics, or other performance characteristics.

In one embodiment, the memory resource table 400 and the link table 410 are stored in distributed fashion across the network 100. Portions of the tables 400 and 410 are located in physically separate and predetermined locations in the network 100. For example, node 101 may store the portions of tables 400 and 410 containing memory resource and link information for nodes that are in the same server rack as node 101, or that are located within a predetermined number of network hops from the node 101. The distributed storage of tables 400 and 410 facilitate access to the memory resource and link information from different locations in the datacenter network 100. In alternative embodiments, the memory resource table 400 and link table 410 are stored at a single location, such as within a single node.

The information stored in the memory resource table 400 and the link table 410 is also duplicated in different locations in the network 100. In some embodiments, the tables 400 and 410 are duplicated in whole at different locations; alternatively, portions of the tables 400 and 410 are duplicated separately. The duplication of tables 400 and 410 provides reliability and fault tolerance for the stored memory pool metadata.

The storage of the memory resource table 400 and the link table 410 may be achieved by any of various storage implementations. In one embodiment, the tables 400 and 410 are stored in a relational database management system (DBMS) deployed across multiple storage locations connected to the datacenter network 100. In an alternative embodiment, the tables 400 and 410 can be stored using virtualized object storage maintained within a cloud environment.

Figure 5:
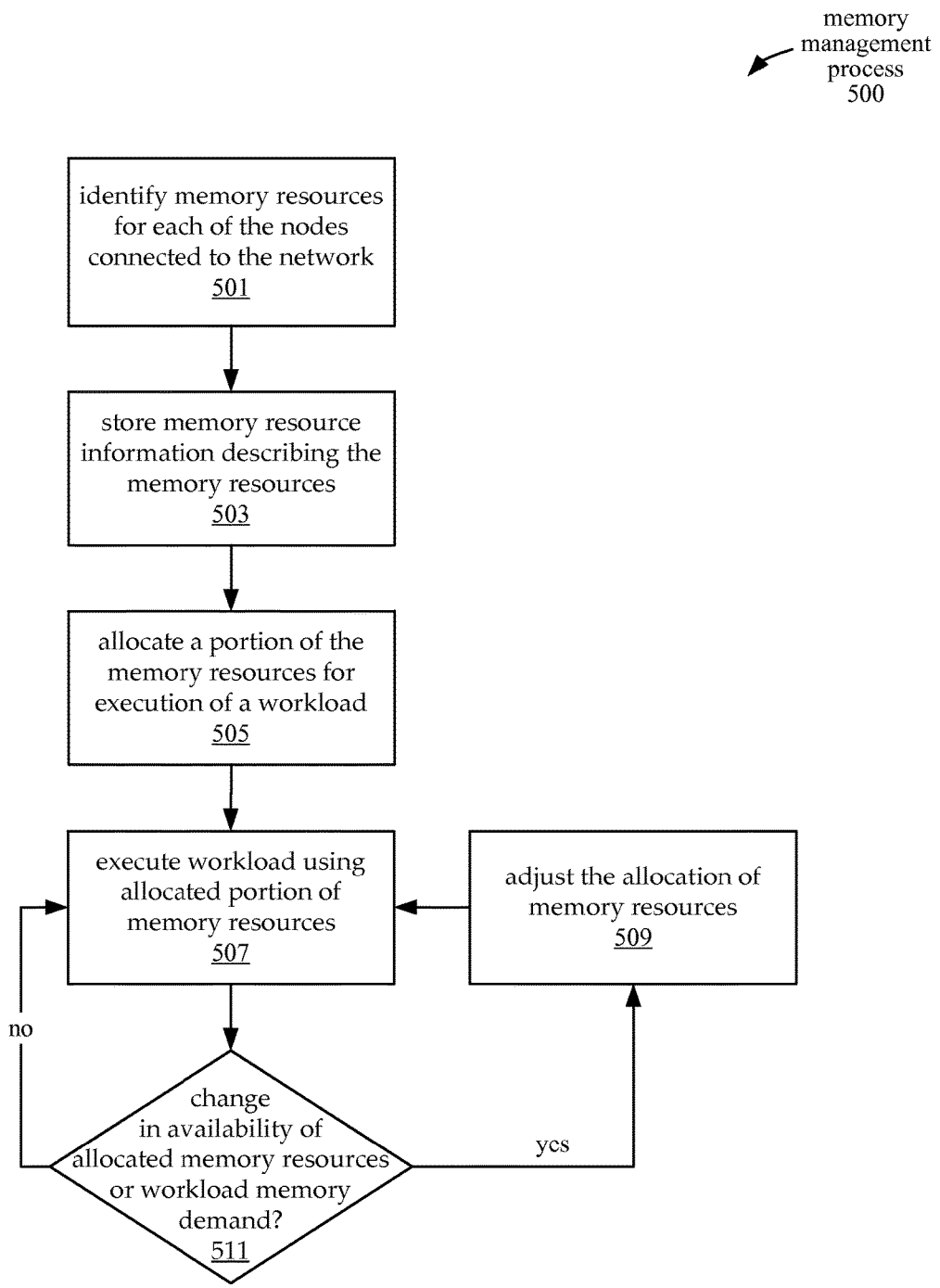
FIG. 5 is a flow diagram illustrating an embodiment of a process of managing memory in a datacenter network.

FIG. 5 illustrates a process 500 for managing memory in a datacenter network, according to an embodiment. The memory management process 500 is implemented in the computational resources of a datacenter, such as one or more of the nodes 101-106. By the operation of process 500, a runtime system 203 running in the datacenter identifies and allocates memory resources in the datacenter for execution of one or more workloads. Process 500 begins at block 501.

At block 501, the datacenter runtime system 203, as implemented by the node 101, identifies memory resources controlled by each of multiple nodes connected to the network 100. From block 501, the process 500 continues at block 503. At block 503, the runtime system 203 stores memory resource information describing the memory resources identified at block 501. From block 503, the process 500 continues at block 505.

At block 505, the runtime system 203 allocates a portion of the memory resources identified at block 501 for execution of a workload. The runtime system 203 allocates the memory resources based on the memory resource information stored at block 503. From block 505, the process 500 continues at block 507. At block 507, the runtime system 203 executes the workload using the allocated portion of the memory resources. From block 507, the process 500 continues at block 511.

At block 511, the runtime system 203 detects or is otherwise notified of a change in the availability of the memory resources allocated for execution of the workload or if the memory demands of the workload change. If there is a change in the availability of the allocated memory resources or in the workload memory demand, the process 500 continues at block 509.

At block 509, the runtime system 203 adjusts the allocation of memory resources for executing the workload in response to the change in the availability of the memory resources or in the workload memory demand detected at block 511. From block 509, the process 500 continues back to block 507, where the runtime system 203 resumes executing the workload using the adjusted allocated portion of the memory resources.

If, at block 511, the runtime system 203 does not detect a change or receive notification of a change in the availability of the allocated memory resources or in the workload memory demand, the process 500 continues from block 511 to block 507 to continues executing the workload using the previously allocated portion of the memory resources.

Figure 6:
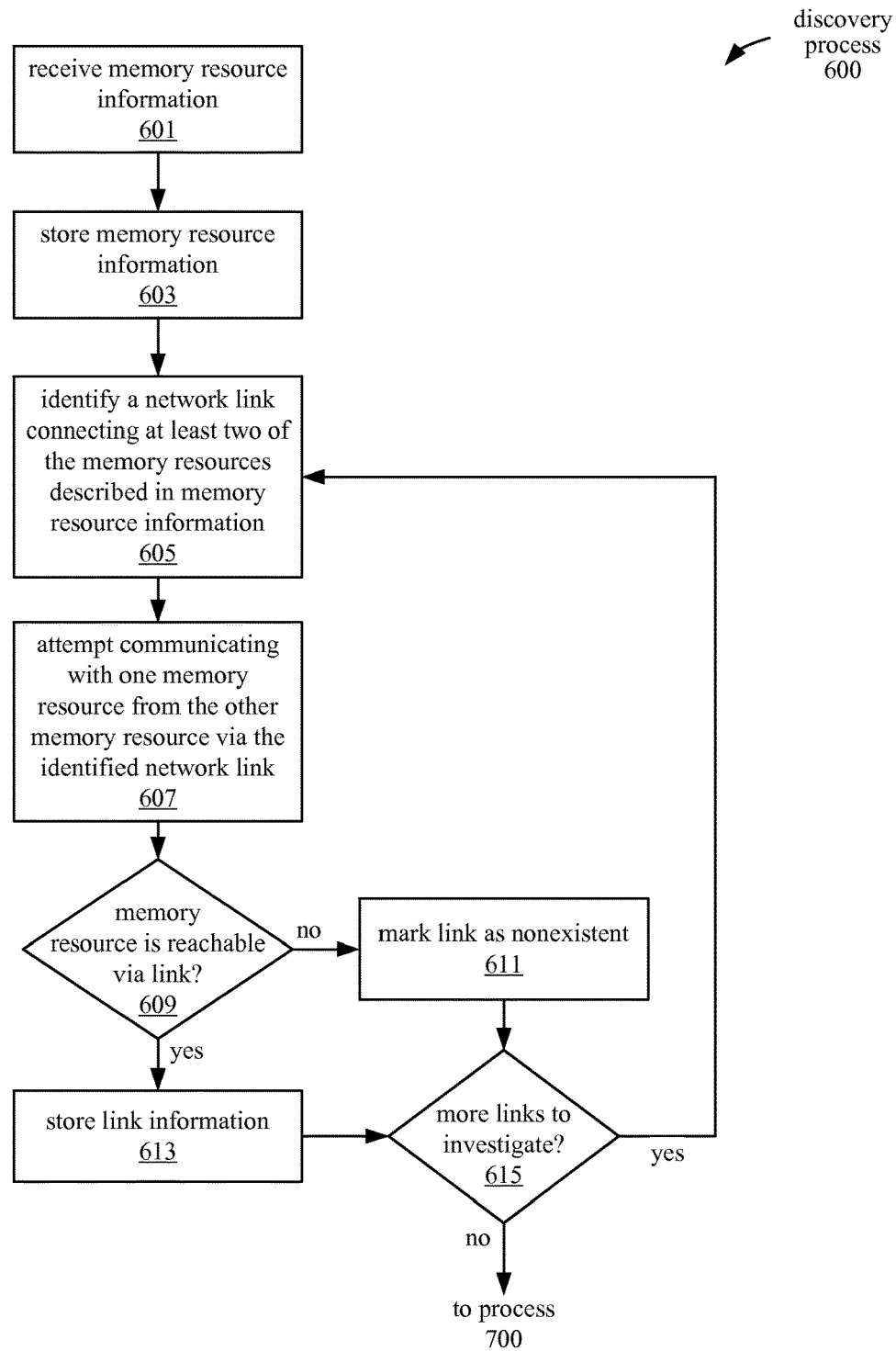
FIG. 6 is a flow diagram illustrating an embodiment of a process of discovering memory resources in a datacenter network.

FIG. 6 is a flow diagram illustrating a discovery process 600 that can be performed by a runtime system 203 of a datacenter, according to an embodiment. The operations in the discovery process 600 correspond to blocks 501 and 503 in the memory management process 500. For example, blocks 601, 605-611, and 615 are operations that facilitate the identification of memory resources, as provided at block 501 in process 500, while blocks 603 and 613 are operations for storing memory resource information, as provided at block 503. By operation of the discovery process 600, the runtime system 203 can detect the number and type of MLMs that are connected to the datacenter network 100. The runtime system 203 adds the detected MLMs to a pool of available memory resources that can be allocated for the execution of workloads.

The process 600 begins at block 601. At block 601, the runtime system 203 receives memory resource information that describes the memory resources in the network 100. For each node of the nodes in the network 100 (i.e., nodes 101-106), the node transmits memory resource information to the runtime system 203, where the memory resource information describes the memory resources controlled by the node. In some embodiments, the memory resource information, such as the type of MLM and its operating characteristics, can be taken from the basic input/output system (BIOS) of the node controlling the memory resource during the boot process of the node. This information can be retrieved from the BIOS by a special node agent, or by an operating system (OS) running on the node. From block 601, the process 600 continues at block 603.

At block 603, the runtime system 203 stores the received memory resource information that describes the memory resources controlled by the nodes. The runtime system 203 stores the memory resource information in the memory resource table 400, as illustrated in FIG. 4A. From block 603, the process 600 continues at block 605.

In addition to the memory resource information stored in the memory resource table 400, the runtime system 203 also determines how the MLMs in the datacenter network (both external 100 and internal 201 to the nodes) are connected to each other and determines the parameters of the network links connecting the MLMs (e.g., latency, bandwidth and coherency). Thus, at blocks 605-615, the runtime system 203 dynamically identifies the topology of the network. To dynamically identify the topology of the network, the runtime system 203 employs decentralized discovery techniques; for example, the runtime system 203 may instantiate one or more crawlers. Such crawlers traverse the nodes in the network 100 and the internal networks within each node starting from nodes with known network links. For example, a crawler may start from a root node, such as node 100, then traverse via additional nodes 102 and 103 by identifying the network links 112 and 113 between the root node and the additional nodes.

At block 605, the crawler instantiated by the runtime system 203 identifies a network link connected at least two of the memory resources described in the memory resource table 400. For example, the crawler may identify the network link 112 between the memory resources of nodes 101 and 102, which both have memory resources described in the table 400. At block 607, the crawler attempts establish communication between one of the two memory resources (a root memory resource) and the other memory resource (an adjacent memory resource) over the identified network link. Continuing the above example, the crawler would attempt to use the network link 112 to establish communication between the memory resources of root node 101 and its adjacent node 102.

At block 609, if the communication is successful, (i.e., the adjacent memory resource is reachable from the root memory resource via the identified network link), then information describing the link is stored, as provided at block 613. The link information is stored in table 410. If, at block 609, the communication is not successful or the adjacent memory resource is otherwise determined to be unreachable, then the link is marked as nonexistent, so that the current instance of the discovery process 600 does not attempt to establish communication over the link again.

From blocks 611 and 613, the process 600 continues at block 615. At block 615, if more potential network links remain to be investigated, the process continues back to block 605. Thus, by the execution of blocks 605-615, the crawler attempts to establish communication via all of the possible network links between the memory resources in the table 400. In alternative embodiments, some of the potential network links may be pruned to reduce the number of times blocks 605-615 are performed.

In one embodiment, the runtime system 203 instantiates more than one crawler to traverse the network 100 and identify the network links connecting the memory resources in table 400. In such embodiments, the multiple crawlers identify potential network links based on the same table 400 and store the discovered link information in same link table 410.

Figure 7:
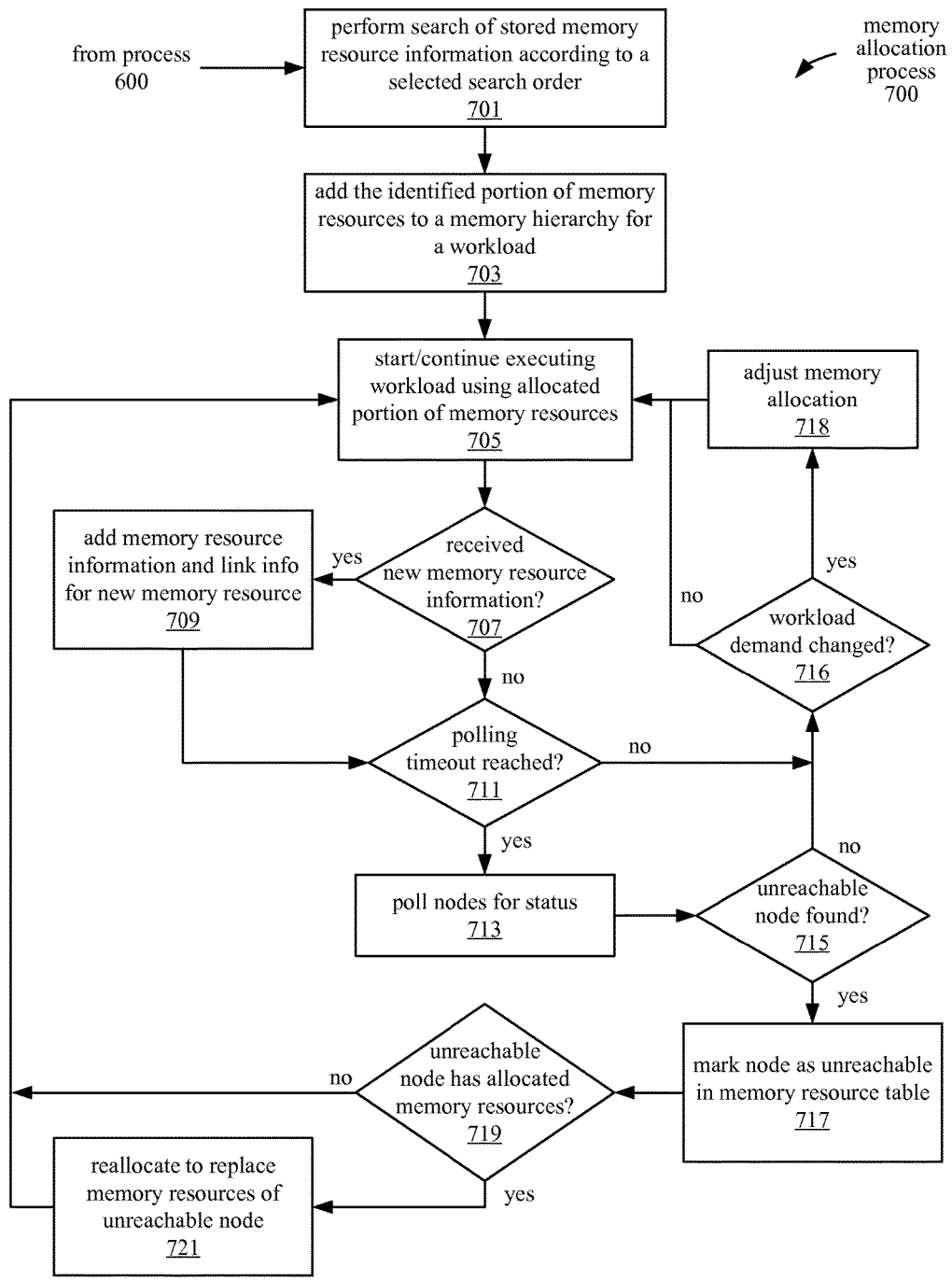
FIG. 7 is a flow diagram illustrating an embodiment of a process of allocating memory resources in a datacenter network.

At block 615, if all of the potential network links have been investigated, the process 600 ends and process 700 begins, as illustrated in FIG. 7. The memory allocation process 700 corresponds to blocks 505, 507, 509, and 511 of the memory management process 500 illustrated in FIG. 5. In particular, blocks 701 and 703 correspond to block 505, block 705 corresponds to block 507, blocks 707-716 correspond to block 511, and blocks 717-721 correspond to block 509 of process 500.

The memory allocation process 700 is performed by the runtime system 203 to allocate a portion of the discovered memory resources to a workload based on the stored memory resource information, then execute the workload using the allocated memory resources on one of the nodes in the datacenter network 100 (e.g., computing node 101). The process 700 also adjusts the allocation of the memory resources to accommodate changes in the availability of the allocated memory resources or changes in the memory demand of the workload. While the memory allocation process 700 is illustrated as allocating memory resources for a single workload, the process 700 may be performed multiple times in order to allocate memory resources for multiple workloads to be executed in one or more nodes in the datacenter network 100.

For a given workload to be executed on a node, the runtime system 203 constructs a memory hierarchy, which is a data structure that designates memory resources that are allocated for the execution of the workload. The runtime system 203 constructs the memory hierarchy for the workload from the pool of available memory resources that are described in the memory resource table 400. During the allocation process, the runtime system 203 determines which memory resources to include in the memory hierarchy; in particular, the runtime system 203 selects the memory resources to include in the memory hierarchy based on the characteristics of the memory (e.g., speed, size, etc.) and the location of the memory (e.g., distance from the node assigned to execute the workload).

The memory allocation process 700 begins at block 701. At block 701, the runtime system 203 identifies a portion of the available memory resources for allocating to the workload by performing a search of the stored memory resource information according to a search order that is selected based on characteristics of the workload. In one embodiment, the search order is selected from one of multiple available search orders, including but not limited to: depth-first search with increasing memory allocation, depth-first search with decreasing memory allocation, breadth-first search with increasing memory allocation, and breadth-first search with decreasing memory allocation.

For the depth-first search orders, the depth-first search applies to the memory levels within the individual nodes, while traversal of the nodes themselves are performed in a breadth-first order. Since the nodes are traversed in a breadth-first order, any nodes that are reachable from the executing node by a shorter communication path (i.e., having fewer network links) are traversed before any nodes having a longer communication path (i.e., having a greater number of network links) to the executing node. With regard to FIG. 1, for example, a search of the nodes in breadth-first order traverses the nodes in the following order: node 101, node 102, node 103, node 104, and node 105. As a result, memory is allocated from the nodes reachable from the executing node 101 by fewer network links, thus reducing the amount of network traffic and latency. Alternative embodiments may implement a weighted breadth-first search, where the network links are weighted with a cost value and the search is performed by traversing the nodes in order according to the cost of the shortest communication path connecting each node to the executing node.

When searching for memory resources to allocate according to a depth-first search order of memory levels, the memory resources allocated to the workload will first be allocated from the memory levels that are the closest to (i.e., reachable via the fewest network links from) one or more computing nodes that are assigned to execute the workload. After traversing the memory levels of the closest nodes in depth-first order, the runtime system 203 then traverses (in breadth-first order) to nodes that are adjacent to the closest nodes to allocate memory resources from these adjacent nodes.

For example, when allocating memory for the execution of a workload to be executed on node 101, the runtime system 203 allocating according to the depth-first search order may traverse the memory levels 101-1 to 101-n controlled by the executing node 101 in depth-first order, then traverse to node 102 to allocate memory resources from memory levels 102-1 to 102-j, then traverse to node 103 to allocate memory resources from memory levels 103-1 to 103-m. Thus, while the nodes 101, 102, and 103 are traversed in breadth-first order, the memory levels within each node are traversed in depth-first order.

When the depth-first search is performed with increasing memory allocation, the runtime system 203 allocates a greater amount of memory for each additional memory level that is included in the memory hierarchy for the workload. This results in a smaller amount of the faster and more expensive memory and a larger amount of the cheaper and slower memory being allocated for execution of the workload. For example, with reference to FIG. 3, increasing memory allocation would result in a greater amount of NVRAM 304 being allocated to a workload and a smaller amount of DRAM 303 allocated to the workload. The amount of memory allocated between different levels may be increased by a fixed amount or by a percentage of the total memory demand for the workload.

When a depth-first search is performed with decreasing memory allocation for additional memory levels, the runtime system 203 allocates a smaller amount of memory for each additional memory level that is included in the memory hierarchy for the workload. This results in a larger amount of the faster and more expensive memory and a smaller amount of the cheaper and slower memory being allocated for execution of the workload. For example, with reference to FIG. 3, decreasing memory allocation would results in a smaller amount of NVRAM 304 being allocated to a workload and a larger amount of DRAM 303 allocated to the workload. The amount of memory allocated between different levels may be decreased by a fixed amount or by a percentage of the total memory demand for the workload. Depth-first search with decreasing memory allocation can be used for workloads that are sensitive to memory latency or frequently write data into their allocated memory regions.

When searching for memory resources to allocate according to a breadth-first search order of memory levels, the memory resources allocated to the workload will first be allocated from the lowest memory levels of multiple nodes that are the closest to the one or more computing nodes that are assigned to execute the workload before allocating higher memory levels in the same nodes.

In one embodiment, the links between memory levels and between MLMs within the same node are treated as having the same cost as links between nodes. In such an embodiment, a runtime system 203 allocating memory for the execution of a workload to be executed on node 101 according to the breadth-first search order may traverse the nodes and memory levels in the following order: node 101, level 101-1, node 102, level 102-1, node 103, level 103-1, level 103-11, level 101-2, etc. Thus, both the nodes and the memory levels are traversed in breadth-first order. In alternative embodiments, the links between nodes and the links between memory levels/MLMs can be given different costs to effect an allocation of memory resources that is more widely or less widely distributed across the network 101.

The runtime system 203 allocating memory resources according to the breadth-first search order with increasing memory allocation allocates a greater amount of memory from the higher (i.e., slower, larger, and cheaper) memory levels and a smaller amount of memory from the lower (i.e., faster, smaller, and more expensive) memory levels. For example, the runtime system 203 may allocate a small amount of memory from each of the lower memory levels in the following order: 101-1, 102-1, 103-1, 104-1, and 105-1. Then the runtime system 203 may allocate a larger amount of memory from each of the higher memory levels in the following order: 101-2, 102-2, 103-2, 104-2, and 105-2. The breadth-first search with increasing allocation can be used for critical workloads where resilience is important. Since the memory allocated to the workload is distributed across multiple nodes, the workload can recover if the memory resources of any single node unexpectedly becomes unavailable.

The breadth-first search may alternatively be performed with decreasing allocation, where more memory is allocated from the lower level (i.e., faster, smaller, and more expensive) memory and less memory is allocated from the higher level (i.e., slower, larger, and cheaper) memory. For example, the runtime system 203 may allocate a larger amount of memory from each of the lower memory levels in the following order: 101-1, 102-1, 103-1, 104-1, and 105-1. Then the runtime system 203 may allocate a smaller amount of memory from each of the higher memory levels in the following order: 101-2, 102-2, 103-2, 104-2, and 105-2.

Aside from the depth-first and breadth-first search orders described above, the runtime system 203 may also utilize different search orders based on user input describing a workload for which memory is to be allocated, or performance targets for the datacenter. For example, the runtime system 203 may, starting from the executing node 101, traverse the nodes in the network 101 to allocate memory resources that consume the least power. Upon allocating a first memory resource having the lowest power consumption in a node, the runtime system would then allocate another memory resource connected to the first memory resource that has the lowest power consumption among the memory resource in the node.

In one embodiment, the selection of a particular search order or other policy for allocating memory resources can be indicated by a datacenter user. In this case, the datacenter user may provide inputs describing a requested workload in terms of importance, latency-tolerance and power efficiency. In an alternative embodiment, the datacenter profiles running workload dynamically and chooses an allocation strategy independently from any user input.

As the runtime system 203 identifies the memory resources to be allocated to the workload, as provided at block 701, the runtime system 203 allocates the memory resources by adding the memory resources to a memory hierarchy for the workload, as provided at block 703. For example, the runtime system 203 may allocate the memory resource on level 101-1 for the execution of the workload by copying memory resource information describing the memory resource on the memory level 101-1 to the memory hierarchy 206B. Thus, the runtime system 203 stores memory resource information for each of the allocated memory levels in the memory hierarchy 206B. From block 703, the process 700 continues at block 705.

At block 705, the runtime system 203 initiates execution of the workload using the allocated memory resources, as designated in the memory hierarchy 206B. From block 705, the process 700 continues at block 707.

At block 707, the runtime system 203 determines whether new memory resource information has been received. Such new memory resource information may be transmitted to the runtime system 203 in response to various events; for example, the memory resource information may be reported by a node being added to the network 100. The new memory resource information may also be transmitted in response to the addition or removal of a memory module, resulting in the increase or decrease in capacity of a corresponding memory level or the addition or removal of a corresponding memory level. Some nodes in the datacenter network 100 may include memory (e.g., PCRAM and Flash technologies) that can act as either memory or storage; new memory resource information can be transmitted to the runtime system 203 in response to the reconfiguration or remounting of such memory resource to change their roles in the system. The transmission of the new memory resource information is initiated by the system software (which may include firmware, operating system, middleware, etc.) of the node in which the change in memory resources takes place. At block 707, if the runtime system 203 has received new memory resource information, the process 700 continues at block 709; otherwise, the process 700 continues at block 711.

At block 709, the runtime system 203 stores the new memory resource information by adding the information to the memory resource table 400. The runtime system 203 may also discover any new network links that connect the new memory resources to the rest of the network 100 and store the new link information in the link table 410. From block 709, the process 700 continues at block 711.

In addition to adding memory resources to the pool of available memory resources when a node is added to the network 100, the datacenter can also determine when a node has been disconnected from the network or is unreachable for other reasons, such as server fault or shutdown. Thus, the runtime system 203 periodically polls the nodes in the network 100 to determine whether the nodes are reachable. At block 711, the runtime system 203 determines whether a polling timeout has elapsed. If the polling timeout period has not elapsed, the process 700 continues to block 716; otherwise, if the polling timeout period has elapsed, the process 700 continues at block 713.

At block 716, the runtime system 203 determines whether the workload memory demand has changed. For example, the runtime system 203 may determine that memory demand for the workload being executed has increased or decreased based on whether some performance metrics for the execution of the workload are being met, or the workload itself may request an increase or decrease in the memory allocated to the workload. If the memory demand for the workload has changed, the process 700 continues at block 718.

At block 718, the runtime system 203 adjusts the memory allocation for the workload in response to the change in the memory demand of the workload. For example, the runtime system 203 may add or remove memory resource information in the memory hierarchy for the workload. From block 718, the process 700 continues back to block 715 to continue executing the workload using the new memory allocation.

If, at block 711, the polling timeout has been reached, the process 700 continues at block 713. At block 713, the runtime system 203 polls the nodes 101-106 in the network 100 to determine whether any of the nodes have become unreachable. This polling can be accomplished by periodic checking of an Intelligent Platform Management Interface (IPMI), Integrated Lights-Out 3 (iLO 3) interface, or another similar interface that facilitates diagnosis of node health even for nodes that are unreachable. From block 713, the process 700 continues at block 715.

At block 715, if no unreachable node is found, the process 700 continues back to block 705 to continue executing the workload using the allocated memory resources. Otherwise, if an unreachable node is found, the process 700 continues at block 717.

At block 717, the runtime system 203 designates the memory resources controlled by the unreachable node as unavailable in the memory resource table 400. In one embodiment, the runtime system 203 deletes the memory resource information of the unavailable memory resources from the table 400; alternatively, a flag or other variable associated with the memory resource information can be used to indicate whether or not the memory resource is available. From block 717, the process 700 continues at block 719.

At block 719, the runtime system 203 determines whether the unreachable node has memory resources that are allocated for execution of the workload; for example, the runtime system 203 can match the memory resource ID 401 of the unavailable memory resources with the memory resource IDs stored in the memory hierarchy for the workload. At block 719, if none of the allocated memory resources were controlled by the unreachable node, then the process 700 continues back to block 715, where the execution of the workload can proceed using the existing allocation of memory resources. Otherwise, if any of the memory resources allocated for the workload were controlled by the unreachable node, then the process 700 continues at block 721.

At block 721, the runtime system 203 reallocates memory resources in the network 100 to replace the subportion of memory resources made unavailable by the unreachable node. If the workload has not yet stored any program data in the unreachable subportion of the allocated memory resources, then additional memory resources can be allocated to replace the unreachable subportion of the allocated memory resources without disrupting the normal execution of the workload.

The memory hierarchy 206B stores a virtual memory address associated with the physical address of the unreachable memory, where the runtime system references the virtual address for execution of the workload. Thus, in order to remove the unreachable memory from the memory hierarchy 206B for the workload, the runtime system 203 can issue a system call to change the physical address of the unreachable memory stored in the memory hierarchy 206B to the physical address of an available memory resource (i.e., a memory resource that is controlled by a node that is capable of communicating with the executing node) for replacing the unreachable memory. The workload can then continue executing using the same virtual address.

If program data had already been written to the unreachable memory, then the runtime system 203 attempts to recreate the data in the additional memory resources after allocating the additional memory resources to replace the unreachable memory. In one embodiment, the program data may be recreated from a backup or checkpoint stored prior to the loss of the unreachable memory. In alternative embodiments, other data recovery techniques may be used.

In some cases, the loss of the unreachable node is scheduled or can otherwise be predicted. In such cases, the memory controlled by the node can be preemptively reallocated, and program data in the memory can be relocated prior to loss of communication with the node.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the node 101 and/or portions thereof carried on the computer-readable storage medium may be a database or other data structure which can be read by a program and used, directly or indirectly, to fabricate the hardware comprising the the node 101. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the the node 101. The netlist may then be placed and routed to produce a data set describing geometric shapes to be applied to masks. The masks may then be used in various semiconductor fabrication steps to produce a semiconductor circuit or circuits corresponding to the the node 101. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method, comprising:
    identifying memory resources for each of a plurality of nodes connected in a network;
    storing memory resource information describing the memory resources;
    retrieving, from the network, topology information for data transmission links in the network; and
    based on the stored memory resource information and based on the retrieved topology information, allocating a portion of the memory resources for execution of instructions in a workload, wherein at least a first node of the plurality of nodes is configured to execute the workload using the allocated portion of the memory resources.

2. The method of claim 1, wherein identifying the memory resources further comprises, for each node of the plurality of nodes connected in the network, receiving from the node the memory resource information that describes the memory resources of the node.

3. The method of claim 1, wherein the memory resources comprise volatile memory and nonvolatile memory.

4. The method of claim 1, wherein the memory resources comprise one or more of a solid state disk, a hard disk drive, flash memory, phase-change memory, spin-transfer torque memory, and memristor memory.

5. The method of claim 1, wherein for each node of the plurality of nodes, the memory resource information identifies the memory resources controlled by the node, and wherein the method further comprises:
    based on the memory resource information, identifying a data transmission link connecting a first memory resource identified by the memory resource information with a second memory resource identified by the memory resource information; and
    communicating with the second memory resource via the identified data transmission link.

6. The method of claim 1, further comprising:
    in response to determining that a node of the plurality of nodes is unreachable, designating the memory resources controlled by the node as unavailable; and
    allocating the portion of the memory resources to replace the unavailable memory resources.

7. The method of claim 1, further comprising, in response to detecting a new node connected to the network, storing memory resource information describing memory resources of the new node.

8. The method of claim 7, further comprising, for each node of the plurality of nodes, determining whether the node is unreachable by periodically polling the node.

9. The method of claim 1, wherein allocating the portion of the memory resources for execution of the first workload further comprises:
   identifying the portion of memory resources by performing a search of the stored memory resource information according to one of a plurality of search orders, wherein the identified portion of the memory resources is determined based on a distance between the first node and, for each memory resource in the identified portion of the memory resources, a node associated with the memory resource; and
   adding the identified portion of the memory resources to a memory hierarchy for the first workload.

10. The method of claim 9, wherein the distance represents a number of hops, and wherein the plurality of search orders includes a depth-first search order and a breadth-first search order, and wherein the method further comprises:
   performing the search according to the depth-first search order by traversing a plurality of memory levels controlled by a second node prior to traversing memory levels of any third node; and
   performing the search according to the breadth-first search order by traversing a first memory level from each of two or more nodes prior to traversing a second memory level from any of the two or more nodes.

11. The method of claim 9, further comprising, prior to traversing a second node, traversing all nodes reachable from the first node by a communication path including fewer data transmission links than a shortest communication path between the first node and the second node.

12. The method of claim 9, further comprising, in response to determining that a node controlling a subportion of memory resources that is included in the memory hierarchy for the first workload is unreachable by the first node, removing the subportion of memory resources from the memory hierarchy of the first workload, wherein removing the subportion of memory resources comprises, for a virtual memory address associated with the memory hierarchy, changing the destination physical address from a physical memory address corresponding to the subportion of memory resources controlled by the unreachable node to a physical memory address corresponding to a different subportion of memory resources controlled by a node that is capable of communicating with the first node.

13. A system, comprising:
   a processor configured to execute a first workload;
   a runtime system coupled with the processor, wherein the runtime system is configured to:
      identify memory resources controlled by each of a plurality of nodes connected in a network, and
      retrieve, from the network, topology information of one or more data transmission links in the network; and
   a memory coupled with the processor, wherein the memory is configured to store memory resource information describing the identified memory resources, wherein the runtime system is further configured to, based on the stored memory resource information and based on the retrieved topology information of the one or more data transmission links in the network, allocate a portion of the identified memory resources for executing instructions in the first workload.

14. The system of claim 13, further comprising the plurality of nodes, wherein each of the plurality of nodes is coupled to at least another node of the plurality of nodes via the one or more data transmission links.

15. The system of claim 14, wherein each of the plurality of nodes comprises:
   a network interface configured to communicate via one of the at least one or more data transmission links;
   a volatile memory coupled with the network interface; and
   a non-volatile memory coupled with the network interface.

16. The system of claim 15, wherein the non-volatile memory comprises one or more of a solid state disk, a hard disk drive, flash memory, phase-change memory, spin-transfer torque memory, and memristor memory.

17. The system of claim 15, wherein the volatile memory comprises dynamic random access memory (DRAM).

18. The system of claim 14, wherein for each node of the plurality of nodes, the node is configured to:
   in response to detecting a connection of the node to the network, provide memory resource information to the runtime system; and
   in response to detecting a change in the memory resources controlled by the node, provide updated memory resource information reflecting the change to the runtime system.

19. The system of claim 13, wherein the runtime system is further configured to:
   identify the memory resources by receiving the memory resource information, wherein for each node of the plurality of nodes, the memory resource information identifies the node and identifies the memory resources controlled by the node; and
   based on the received memory resource information, retrieving the topology information by traversing the network to discover the one or more data transmission links connecting the plurality of memory resources.

20. The system of claim 13, further comprising a memory hierarchy for the workload, wherein the memory hierarchy is coupled with the processor, and wherein the runtime is further configured to allocate the portion of the identified memory resources for the execution of the first workload by:
   identifying the portion of memory resources by performing a search of the stored memory resource information; and
   adding the identified portion of the memory resources to the memory hierarchy.

* * * * *